United States Patent
Mocquard et al.

(10) Patent No.: US 7,295,804 B2
(45) Date of Patent: Nov. 13, 2007

(54) SYSTEM OF RECEIVING SIGNALS WITH ISOFREQUENCY RETRANSMISSION

(75) Inventors: Olivier Mocquard, Rennes (FR); Jean-François Pintos, Bourgbarre (FR); Jean-Luc Robert, Betton (FR); Franck Thudor, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 326 days.

(21) Appl. No.: 10/540,644

(22) PCT Filed: Dec. 18, 2003

(86) PCT No.: PCT/EP03/51051

§ 371 (c)(1),
(2), (4) Date: Jun. 24, 2005

(87) PCT Pub. No.: WO2004/062276

PCT Pub. Date: Jul. 22, 2004

(65) Prior Publication Data

US 2006/0030258 A1   Feb. 9, 2006

(30) Foreign Application Priority Data

Jan. 6, 2003   (FR) .................................. 03 00159

(51) Int. Cl.
*H04H 1/00* (2006.01)

(52) U.S. Cl. .................. 455/3.01; 455/3.02; 455/3.03; 455/3.04; 455/3.05; 455/3.06; 455/132

(58) Field of Classification Search ...... 455/3.01–3.06, 455/7, 11.1, 132; 725/74, 78, 80, 83, 127
See application file for complete search history.

(56) References Cited

U.S. PATENT DOCUMENTS 5,613,191 A   3/1997   Hylton et al.

(Continued)

FOREIGN PATENT DOCUMENTS

EP   1271937   1/2003

(Continued)

OTHER PUBLICATIONS

Search Report Dated Mar. 29, 2004.

*Primary Examiner*—Nay Maung
*Assistant Examiner*—Dominic E. Rego
(74) *Attorney, Agent, or Firm*—Joseph J. Laks; Robert D. Shedd; Paul P. Kiel

(57) ABSTRACT

The present invention concerns a system of receiving signals comprising a retransmission base to amplify signals captured at a point in a domestic environment and retransmit them at the same frequency to digital receivers of the said domestic environment. According to the invention, the retransmission base amplifies and retransmits up to N DVB-T channels the positions of which can be anywhere in the receive band and are chosen dynamically by the system users. Means are provided in the system to share the system's amplification resources between the system's various digital receivers.

6 Claims, 5 Drawing Sheets

U.S. PATENT DOCUMENTS

| | | |
|---|---|---|
| 5,708,971 A | 1/1998 | Dent |
| 5,946,322 A | 8/1999 | Moura et al. |
| 6,760,384 B1* | 7/2004 | Garreau et al. ............. 375/260 |
| 7,116,894 B1* | 10/2006 | Chatterton ................... 386/95 |
| 2002/0004838 A1* | 1/2002 | Hakenberg et al. ......... 709/231 |
| 2002/0167417 A1* | 11/2002 | Welles et al. .......... 340/825.49 |
| 2003/0066082 A1* | 4/2003 | Kliger et al. ................. 725/80 |
| 2004/0250273 A1* | 12/2004 | Swix et al. ................... 725/25 |

FOREIGN PATENT DOCUMENTS

| | | | |
|---|---|---|---|
| FR | 2697699 | * | 5/1994 |
| WO | WO 01/80547 | | 10/2001 |

* cited by examiner

SYSTEM OF RECEIVING SIGNALS WITH ISOFREQUENCY RETRANSMISSION

This application claims the benefit, under 35 U.S.C. § 365 of International Application PCT/EP03/51051, filed Dec. 18, 2003, which was published in accordance with PCT Article 21(2) on Jul. 22, 2004 in English and which claims the benefit of French patent application No. 0300159, filed Jan. 6, 2003.

BACKGROUND OF THE INVENTION

1. Field of the Invention

The present invention concerns a system of receiving signals, particularly DVB-T (Digital Video Broadcasting-Terrestrial) signals, comprising a retransmission base to amplify the signals captured at a point in a domestic environment and retransmit them at the same frequency to digital receivers of the said domestic environment. The invention particularly relates to Digital Terrestrial Television (DTT).

2. Related Art

The modulation used for the transmission of DVB-T signals is OFDM modulation. This modulation is particularly robust to echoes and makes possible the retransmission of a DVB-T channel at the same frequency in a domestic environment. Thus DVB-T signals can be captured at a point in the environment where they are at a sufficient level and then amplified and retransmitted in the environment to be captured at all points of the said environment by "portable" digital receivers such as digital television sets or analogue television sets with digital terrestrial decoders. This is the principle that has been adopted for Digital Terrestrial Television (DTT). DVB-T signals are captured with an antenna preferably placed outside the home, are reamplified and then retransmitted inside the home.

However, this principle poses feasibility problems. It is currently not feasible to retransmit the totality of the DVB-T signal receive band without risking interference to devices (primarily analogue television receivers) using common frequency bands in the same domestic environment or in a nearby domestic environment. The reamplification of the whole band could in effect cause echoes destroying the analogue reception around the retransmitter and creating intermodulation problems.

Amplification must apply only to the broadcast digital channels. So amplification must be selective. However, it is very difficult to produce a "universal" system that amplifies only the broadcast digital channels. Their number and position in the frequency band vary from one country or region to another. In addition, they are likely to increase significantly in number when analogue broadcasts disappear. So, at the moment, it is not possible to provide the number of amplifiers necessary to produce such a "universal" system.

Currently, the favoured solution consists in amplifying a single channel that is chosen dynamically by the user. This solution however requires the provision of at least one retransmitter for each portable digital apparatus in the home. If the user wants to watch two programmes at the same time on two separate channels, the one being displayed on the television's full screen and the other in a screen window, two retransmitters need to be provided for one receiver. If the user at the same time also wants to record a programme on another channel, three are required. This solution is therefore particularly costly in terms of equipment.

SUMMARY OF THE INVENTION

The purpose of the invention is to overcome the abovementioned disadvantages.

According to the invention, a system is proposed enabling amplification and isofrequency retransmission of up to N channels ($N \geq 2$) that can have any position in the receive band and are chosen dynamically by the system users. Means are provided in the system to share the system's amplification resources between the various digital receivers present in the environment.

The invention is a system of channel reception in a domestic environment comprising a retransmission base to amplify the channels captured at a point of the said domestic environment and retransmit them to a plurality of digital receivers present in the said environment. Each digital receiver comprises means of generating and transmitting at least one channel amplification request with each request being assigned a priority level. The retransmission base comprises amplification means to amplify N channels, N being greater than or equal to 2 and less than the maximum number of channels received at the point of the said domestic environment, and means of controlling the said amplification means to determine the channels to be amplified according to the channel amplification requests received in accordance with the priority levels when the number of amplification requests for different channels is greater than N.

This system can be used to obtain a retransmission base of low complexity (not more than N channels to be amplified) and of low cost.

With preference, the digital receivers communicate with the control circuit of the amplification means via a radio link.

Furthermore, the retransmission base advantageously also comprises means for periodically checking whether each of the up to N amplified channels is being used by at least one of the digital receivers in order to release the amplification means employed to amplify unused channels. Preferentially, the channels are DVB-T channels.

DETAILED DESCRIPTION OF THE DRAWINGS

The abovementioned characteristics and advantages of the invention, as well as others, will be clearly revealed on reading the following description in conjunction with the attached drawings in which.

DETAILED DESCRIPTION

Figure 1:
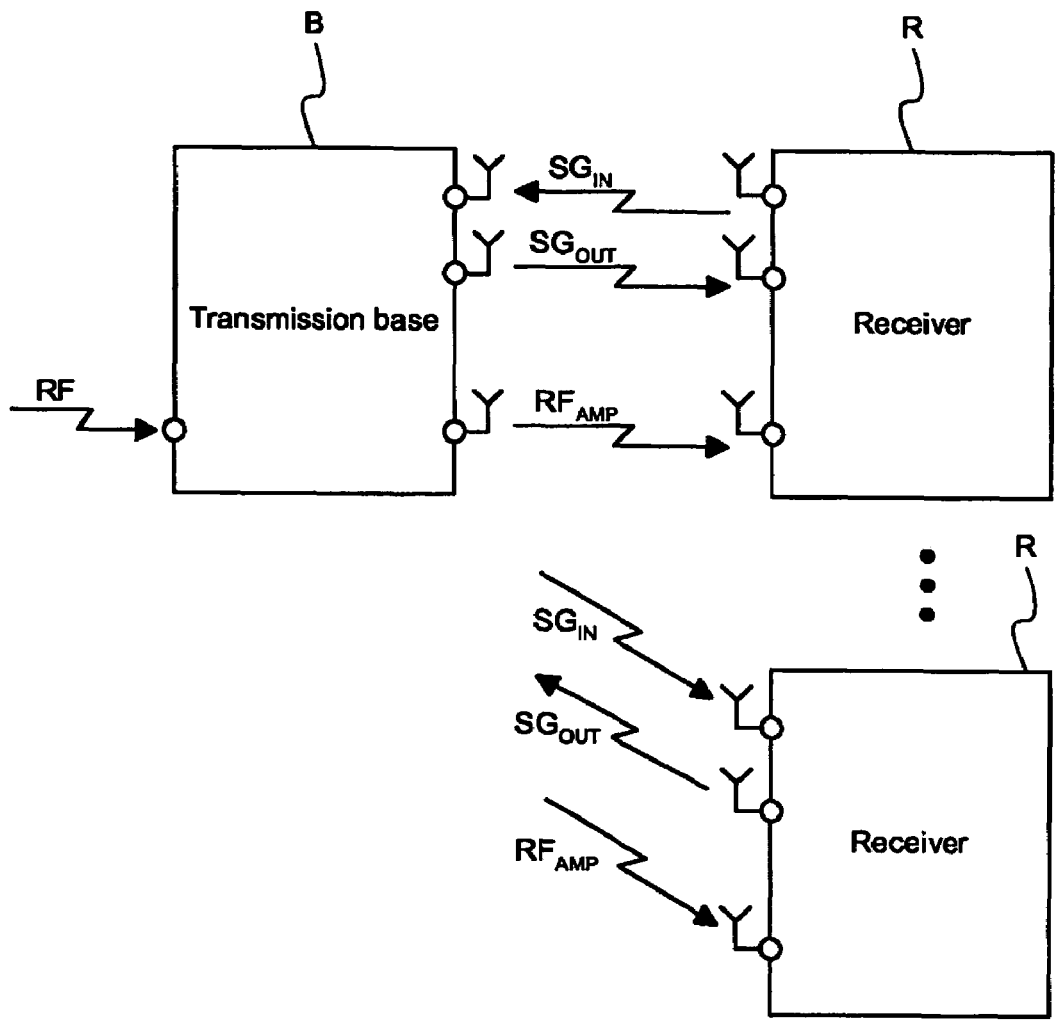
FIG. 1 is a schematic view of a system complying with the invention.

A digital reception system with amplification and retransmission of the digital channels complying with the invention is represented schematically in FIG. 1. It comprises a retransmission base B capable of amplifying and retransmitting at the same frequency up to N DVB-T channels to a plurality of receivers R of DVB-T signals. The number of receivers is unlimited.

The retransmission base B receives DVB-T signals, marked RF in the figure, and amplifies a part of them and retransmits them towards the receivers R. The amplified signals are marked $RF_{AMP}$. The signals RF are for example captured by a fixed outdoor antenna connected to a signal input on the retransmission base B. The signals $RF_{AMP}$ are broadcast in the environment of the retransmission base B via a retransmission antenna connected to a signal output of the latter.

In a variant, the signals RF can be received from an indoor antenna, placed close to the retransmission antenna. However, it is advisable to have good insulation between the transmit and receive antennas and to use, for example, directional antennas while limiting the transmission power to avoid resultant echoes.

The channels to be amplified are determined according to the requirements of the receivers R of the system. So, signals $SG_{IN}$ and $SG_{OUT}$ are interchanged between the retransmission base B and the receivers R so that the retransmission base manages its amplification resources in coordination with the receivers. The signals $SG_{IN}$ are the management signals transmitted by the receivers R towards the base B and the signals $SG_{OUT}$ are the management signals passing through the base B to the receivers R.

Included in the signals $SG_{IN}$ transmitted by the receivers R are channel amplification requests. In effect, to view a programme on a receiver R in the environment, a resource of the base B must be allocated to amplification of the channel containing that programme. An amplification request to amplify that channel is therefore sent to the retransmission base B. This request is satisfied by the base if one of its amplification resources is available or, as will be seen in greater detail below, if it has priority over other requests already sent.

The signals $SG_{OUT}$ are, for their part, employed to check that each channel amplified by the retransmission base B is used effectively by at least one receiver R of the environment. If one of the amplified channels is no longer being used by any of the system's receivers, provision is then made to deactivate the resource allocated to its amplification.

Signals $SG_{OUT}$ are therefore sent to the receivers R
either periodically, to request them to signal the channel or channels they are using, when no other dedicated mechanism has been provided to notify the retransmission base that a channel is no longer being used,
or when a channel amplification request cannot be satisfied by the retransmission base B without releasing one of its amplification resources.

In response to such a signal, the receiver returns for example an amplification request $SG_{IN}$ for the channel or channels it is using. The retransmission base B then maintains the amplification resources for the channels for which it has again received an amplification request. If, following this operation, no amplification resource of the base can be released, means can be provided for asking the receiver that has generated the amplification request to display a message notifying the user that his request cannot be satisfied. A signal $SG_{OUT}$ is transmitted to that effect to the receiver concerned.

As an enhancement, priority levels can be defined for each channel to be amplified, for example:
a low priority level, P0;
an intermediate priority level, P1; and
a high priority level, P2.

Priority level P0 is assigned to the channels that are to be amplified only if one of the amplification subsystems of the retransmission base B is available. Conversely, a request to amplify a channel with priority P2 will cause the release of one of the resources assigned to the amplification of channels with priority P0 or P1 if no other amplification resource is available and will cause that resource to be allocated to the amplification of the channel with priority P2. Similarly, a request to amplify a channel with priority P1 will cause the release of one of the resources allocated to the amplification of channels with priority P0 if no other amplification resource is available and will cause that resource to be allocated to the amplification of the channel with priority P1.

Irrespective of the embodiment adopted (with or without priority level), the management of the system's amplification resources is centralized in the retransmission base B. Preferably, the retransmission base B, on power-up and subsequently at regular intervals, communicates with the receivers likely to transmit amplification requests to it (receivers powered up) and updates a table of allocation of its resources. The allocation table associates with each amplification resource a channel number and where appropriate a priority level and/or additional information. If a resource is not being used by any receiver, it appears as available in the allocation table and is materially deactivated.

Figure 2:
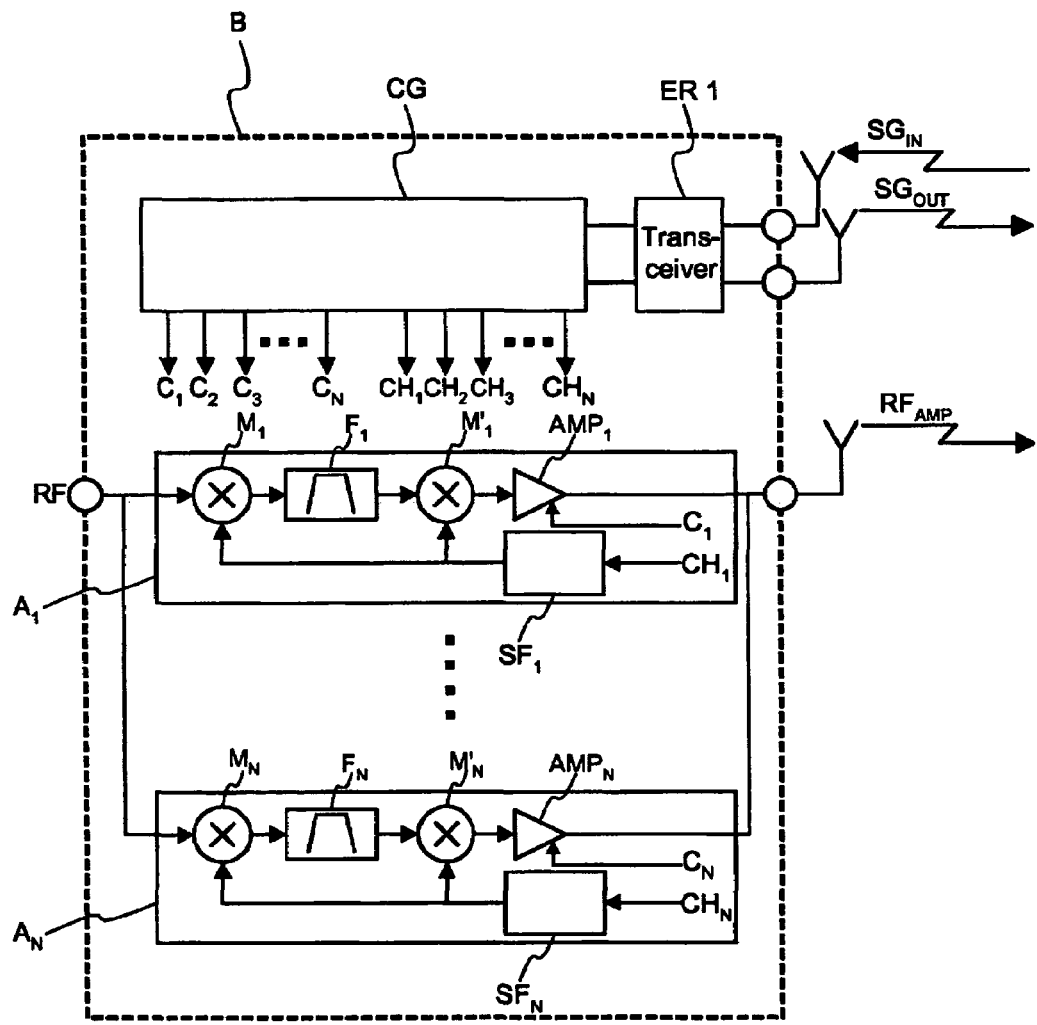
FIG. 2 is a method of producing a retransmission base of the system in FIG. 1.

An exemplary of embodiment of the retransmission base B is offered in FIG. 2. It comprises N selective amplification subsystems, $A_1$ to $A_N$, each amplifying one DVB-T channel of all the DVB-T channels received by the base, a transmit/receive circuit ER1 of signals $SG_{IN}$ and $SG_{OUT}$, and a control circuit CG of the resources to control the amplification subsystems according to the signals $SG_{IN}$ received. The resource management circuit CG delivers, for each amplification subsystem $A_i$, $i \in [1 \ldots N]$, a switch on/switch off signal $C_i$ of the subsystem and a channel signal $CH_i$ relating to the channel to be amplified.

In the example in FIG. 2, each amplification subsystem $A_i$, $i \in [1 \ldots N]$, comprises a frequency synthesizer $SF_i$ to generate a reference signal, an initial mixer $M_i$ to mix the signal RF received with the reference signal and deliver an intermediate frequency signal, a fixed passband filter $F_i$ to filter the said intermediate signal, a second mixer $M'_i$ to mix the filtered intermediate signal with the reference signal and an amplifier $AMP_i$ to amplify the resulting signal. The frequency of the reference signal delivered by the frequency synthesizer is fixed by the signal $CH_i$ and the powering up of the amplifier $A_i$ is conditioned by the signal $C_i$.

As a variant, the amplifier can be common to the N amplification subsystems.

As another variant, instead of the two mixers, the fixed filter and the frequency synthesizer, a filter can be provided with a passband that is adjustable in terms of frequency. This filter will be for example implemented in a MEMS (for Micro Electro-Mechanical System) technology.

When the circuit CG receives a request to amplify a given channel, it switches on one of the available amplification subsystems of the retransmission base and configures it using the $CH_i$ signal to amplify the required channel. The system's amplification resource allocation table is then updated. This is stored in the control circuit CG.

Figure 3:
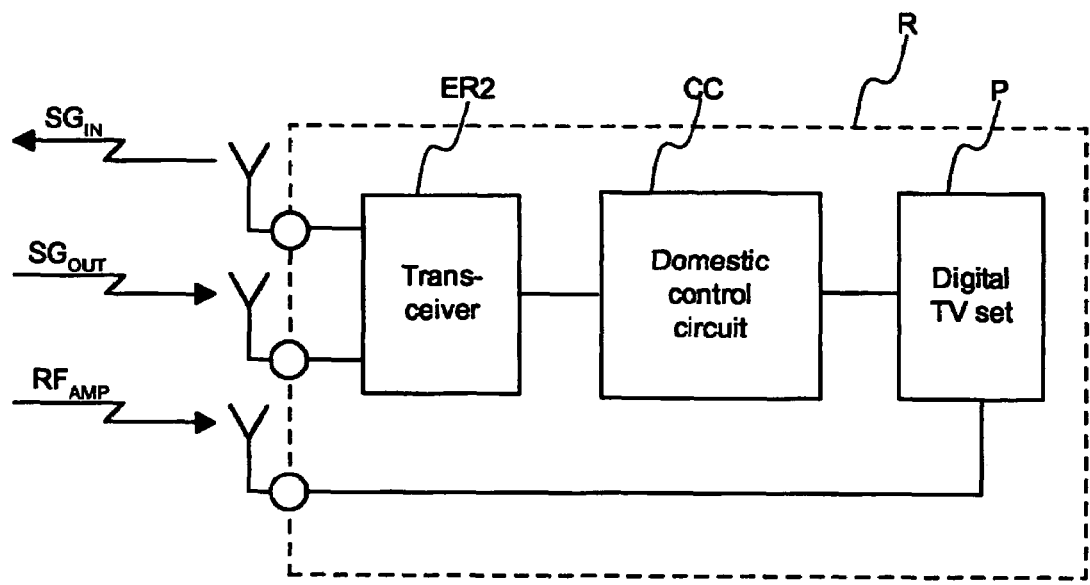
FIG. 3 is a method of producing a digital receiver of the system in FIG. 1.

A schematic diagram of a digital receiver complying with the invention is given as an example in FIG. 3. This receiver comprises a digital television set P, a circuit known as the domestic control circuit CC and a transceiver ER2. The domestic control circuit CC is responsible for producing signals $SG_{IN}$ according to the requirements of the receiver's user. For example, if the user wants to watch a programme on a given channel, the domestic control circuit sends to the base B a signal $SG_{IN}$ containing a request to amplify that channel. The domestic control circuit CC also generates signals $SG_{IN}$ in response to the signals $SG_{OUT}$ received. All the signals $SG_{IN}$ produced by the circuit CC are sent to the base B by the circuit ER1. Similarly, all the signals $SG_{OUT}$ sent to the receiver R are received by the circuit ER1.

The needs of the user of the digital set are communicated to the domestic control circuit CC via an infrared remote control or via the digital set.

It should be noted that the radio link between the retransmission base B and the receivers R is for example an FSK link in the ISM band, typically at 433 MHz or a "Bluetooth" link. As a variant, provision can be made for a communication device using bearer currents between the base and the receivers.

Figure 4:
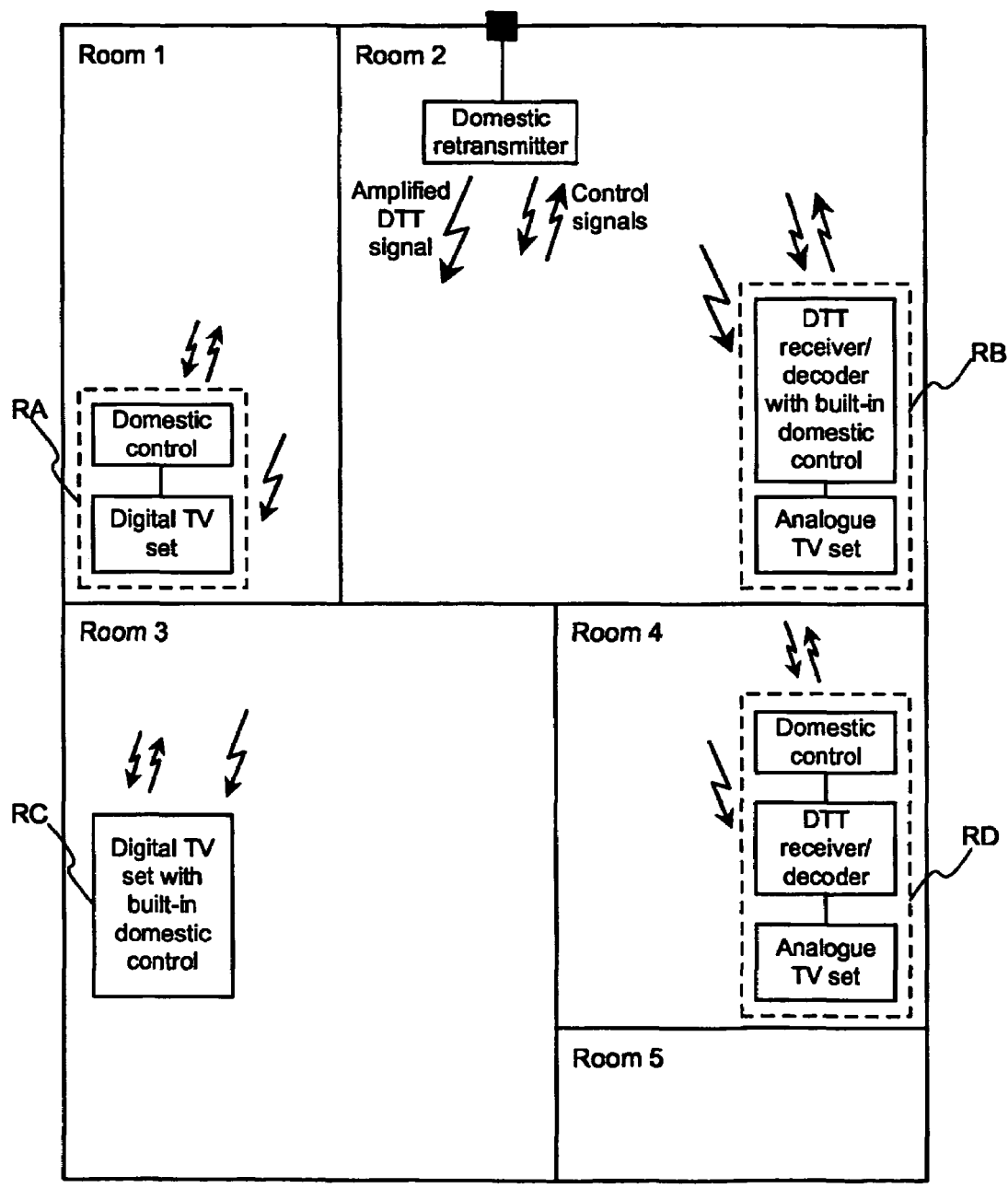
FIG. 4 is an example of the system comprising four digital receivers of different structures.

As an illustration, the operation of the system of the invention can be described in the context of a system as shown in FIG. 4. The different elements of the system are arranged in an apartment containing several rooms. A retransmission base B with three amplification subsystems is used to cover the system's "portable" reception requirements. It is powered by a receive connector connected to a fixed outdoor television antenna. Four receivers are provided in the apartment. They represent four different hardware configurations. The first receiver, marked RA, consists of a digital television set with an external unit for domestic control of the retransmitter. The second receiver, marked RB, takes the form of an analogue television set with a digital decoder with built-in domestic control. The third receiver, marked RC, is a digital television set with built-in domestic control. Finally, an analogue television set with a digital decoder and an external unit for domestic control of the retransmitter forms the fourth receiver marked RD.

Figure 5:
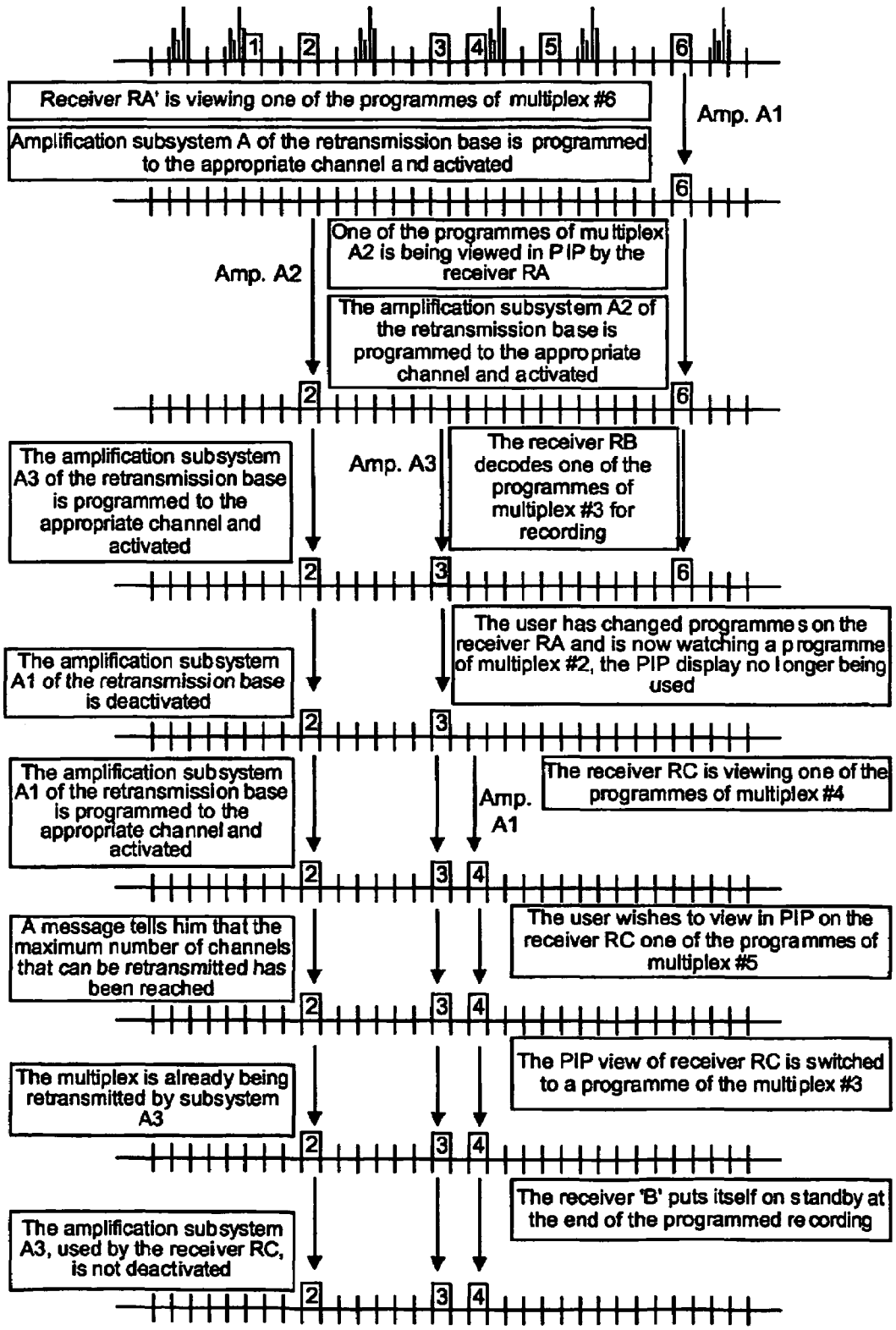
FIG. 5 is a scenario illustrating the process of allocating the resources of the retransmission base for the system shown in FIG. 4.

A scenario illustrating the process of allocating the resources of the retransmitter base for the four receivers RA, RB, RC and RD is given in FIG. 5. In this example, it is assumed that the receive band comprises six digital channels or multiplexes coexisting with analogue channels whereas the retransmission base can amplify only three channels. The scenario unfolds as follows:

the user of receiver RA wants to watch one of the programmes of multiplex #6; the amplification subsystem A1 of the retransmission base is then programmed to the appropriate channel and activated;

the same user also wants to watch, in a window of the receiver RA (PIP viewing: Picture In Picture), a second programme belonging to multiplex #2; the amplification subsystem A2 of the retransmission base is therefore programmed to the appropriate channel and activated;

the user of receiver RB then wants to record one of the programmes of multiplex #3; the amplification subsystem A3 of the retransmission base is then programmed to the appropriate channel and activated;

the user of receiver RA then changes programme and wants to watch a programme of multiplex #2 and delete the PIP viewing; the amplification subsystem A1 is then deactivated;

the user of receiver RC wants to watch one of the programmes of multiplex #4; the amplification subsystem A1 of the retransmission base is then programmed to the appropriate channel and activated;

the user of receiver RC also wants to watch, in a screen window, one of the programmes of multiplex #5; a message telling him that the maximum number of channels that can be retransmitted has been reached is displayed on the screen of the receiver RC;

the user of receiver RC switches the programme displayed in the screen window to watch a programme of multiplex #3; the amplification subsystem A3 is already programmed to the appropriate channel;

the receiver RB is put on standby at the end of recording; the amplification subsystem A3 which is also being used by the receiver RC is therefore not deactivated.

The invention claimed is:

1. System of receiving channels in a domestic environment comprising a retransmission base to amplify channels captured at a point in the said domestic environment and retransmit them to a plurality of digital receivers present in the said environment, wherein:

each digital receiver comprises means of generating and transmitting at least one channel amplification request, each request being allocated a priority level, the said retransmission base comprises amplification means to amplify N channels, N being greater than or equal to 2 and less than the maximum number of channels received at the point in the said domestic environment, and means of control of the said means of amplification to determine the channels to be amplified according to the channel amplification requests received in compliance with the priority levels when the number of amplification requests for different channels is greater than N.

2. System according to claim 1, wherein the said digital receivers communicate with the control circuit of the amplification means via a radio link.

3. System according to claim 1, wherein the retransmission base also comprises means of periodically checking whether each of the maximum N amplified channels is being used by at least one of the digital receivers in order to release the amplification means employed to amplify the unused channels.

4. System according to claim 1, wherein the said amplification means consist of N amplification subsystems each comprising a filter adjustable in terms of frequency by the said control means according to the channel to be amplified and an amplifier.

5. System according to claim 1, wherein the said amplification means consist of N filter subsystems adjustable in terms of frequency by the said control means according to the channels to be amplified and by an amplifier connected to the output of the N filter subsystems.

6. System according to claim 1, wherein the channels are digital terrestrial television broadcast channels.

* * * * *